(12) United States Patent
Kromer et al.

(10) Patent No.: US 9,388,762 B2
(45) Date of Patent: Jul. 12, 2016

(54) METHOD AND DEVICE FOR CONTROLLING AN ADJUSTING DEVICE OF A MOTOR VEHICLE

(71) Applicant: BROSE FAHRZEUGTEILE GMBH & CO. KOMMANDITGESELLSCHAFT, HALLSTADT, Hallstadt (DE)

(72) Inventors: Alex Kromer, Stegaurach (DE); Thomas Klauck, Hergatz (DE)

(73) Assignee: BROSE FAHRZEUGTEILE GMBH & CO. KOMMANDITGESELLSCHAFT, Hallstadt (DE)

( * ) Notice: Subject to any disclaimer, the term of this patent is extended or adjusted under 35 U.S.C. 154(b) by 324 days.

(21) Appl. No.: 13/924,747

(22) Filed: Jun. 24, 2013

(65) Prior Publication Data

US 2013/0276748 A1 Oct. 24, 2013

Related U.S. Application Data

(63) Continuation of application No. PCT/EP2011/005846, filed on Nov. 21, 2011.

(30) Foreign Application Priority Data

Dec. 22, 2010 (DE) .......................... 10 2010 055 650

(51) Int. Cl.
*E05F 15/00* (2015.01)
*F02D 45/00* (2006.01)
(Continued)

(52) U.S. Cl.
CPC ............. *F02D 45/00* (2013.01); *H02H 7/0851* (2013.01); *B60J 7/0573* (2013.01); *B62D 5/0487* (2013.01)

(58) Field of Classification Search
CPC ....... H02H 7/0851; H02H 3/44; H02H 3/006; F02D 45/00; H02P 7/29; B60J 7/0573; B62D 5/0487

USPC ......... 701/49; 318/434, 466, 453, 468; 49/28, 49/506; 361/42, 86, 87; 324/536; 702/58
See application file for complete search history.

(56) References Cited

U.S. PATENT DOCUMENTS 5,982,124 A * 11/1999 Wang .............................. 318/466
6,064,165 A * 5/2000 Boisvert et al. ................ 318/465
(Continued)

FOREIGN PATENT DOCUMENTS

CN 201306085 Y 9/2009
DE 196 15 581 A1 10/1997
(Continued)

OTHER PUBLICATIONS

International Search Report of PCT/EP2011/005846, Dated Feb. 21, 2012.

*Primary Examiner* — Hai Huynh
*Assistant Examiner* — Gonzalo Laguarda
(74) *Attorney, Agent, or Firm* — Laurence A. Greenberg; Werner H. Stemer; Ralph E. Locher

(57) ABSTRACT

In order to control an adjusting device of a motor vehicle, in particular a window lift, having a motor-driven adjusting part, the speed of the drive is controlled to a desired speed value during normal operation at least in a sub-range of an adjustment travel and the driving force is controlled to a desired force value in the event of difficult motion for a first time period. After the first time period has ended, the adjusting part is reversed or the drive is at least stopped in the event of pinching. If the difficult motion is not an event of pinching, the speed of the drive is controlled anew to the desired speed value, wherein the driving force is first reduced to a first force and is increased to the desired force value within a second time period and/or a value realized during normal operation is used as a desired force value for the driving force.

15 Claims, 3 Drawing Sheets

(51) Int. Cl.
*H02H 7/085* (2006.01)
*B62D 5/04* (2006.01)
*B60J 7/057* (2006.01)

(56) References Cited

U.S. PATENT DOCUMENTS

| | | | |
|---|---|---|---|
| 6,236,176 | B1 | 5/2001 | Uebelein et al. |
| 6,555,978 | B1 * | 4/2003 | Castellon ............ 318/266 |
| 8,595,978 | B2 | 12/2013 | Rietdijk |
| 8,766,563 | B2 | 7/2014 | Eggeling et al. |
| 2008/0100247 | A1 * | 5/2008 | Averitt et al. ............ 318/466 |
| 2009/0240401 | A1 * | 9/2009 | Rosch ............ 701/49 |
| 2011/0265381 | A1 * | 11/2011 | Guarnizo ............ 49/26 |
| 2012/0013143 | A1 | 1/2012 | Schiegel |
| 2012/0191305 | A1 * | 7/2012 | Ersek et al. ............ 701/49 |
| 2013/0276748 | A1 * | 10/2013 | Kromer et al. ............ 123/319 |
| 2014/0173984 | A1 * | 6/2014 | Schlesiger et al. ............ 49/28 |

FOREIGN PATENT DOCUMENTS

| | | |
|---|---|---|
| DE | 199 01 840 A1 | 5/2000 |
| EP | 0 966 782 B1 | 10/2001 |
| WO | 2010003841 A1 | 1/2010 |
| WO | 2010046008 A1 | 4/2010 |
| WO | 2010083999 A1 | 7/2010 |

* cited by examiner

METHOD AND DEVICE FOR CONTROLLING AN ADJUSTING DEVICE OF A MOTOR VEHICLE

CROSS-REFERENCE TO RELATED APPLICATION

This is a continuation application, under 35 U.S.C. §120, of international application No. PCT/EP2011/005846, filed Nov. 21, 2011, which designated the United States; this application also claims the priority, under 35 U.S.C. §119, of German patent application No. DE 10 2010 055 650.5, filed Dec. 22, 2010; the prior applications are herewith incorporated by reference in their entireties.

BACKGROUND OF THE INVENTION

Field of the Invention

The invention relates to a method for controlling an adjusting device of a motor vehicle and an adjusting device operating according to the method.

Published, non-prosecuted German patent application DE 196 15 581 A1 describes a method for actuating electric drives in motor vehicles, in which a working range is selected for an electric motor which drives an assembly such as, for example, a windshield wiper or a window pane of an electric window lifter. Working range is understood here to be a torque range or rotational speed range within which the electric motor is operated and whose respective combinations are permissible during operation. In order to prevent damage to the assembly or to the electric motor, the torque of the electric motor is monitored during operation. As soon as a torque occurs which is outside the torque range or at the limit thereof, the electric motor is adjusted to the maximum torque of the torque range.

European patent EP 0 966 782 B1, corresponding to U.S. Pat. No. 6,236,176, discloses a method for performing open-loop and closed-loop control of the movement of electrically driven assemblies. For the adjustment of, for example, a window pane, the electric motor which drives the latter is adjusted to a normal curve. The normal curve is the force required for adjustment, depending on the adjustment path. For each part of the adjustment path, an excess force is defined with which, in particular, an envelope curve is calculated by addition to the normal curve. As soon as the force which is necessary for adjusting the window pane is greater than the maximum force which is predefined by the envelope curve, the adjustment force is limited thereto. If no further adjustment of the window pane takes place within a predefined time period, the movement of the window pane is stopped or the window pane is reversed. The envelope curve and/or the normal curve are preferably determined individually for the electric motor on a test bench and are stored in a table or a characteristic diagram as a function of, for example, the engine rotational speed, the operating temperature and/or ambient temperature.

Published, non-prosecuted German patent DE 199 01 840 A1 discloses an electric actuator drive for motor vehicle components, for example window lifters, and a method for controlling same, wherein particularly rapid adaptation to the current operating states is to be made possible by subordinating a torque adjustment to a rotational speed adjustment. In order to overcome difficulties of movement and to maintain the movement of the motor at a specific rotational speed while taking into account the risk of trapping, the lower maximum current threshold which is used for this purpose can be increased in order to acquire additional information from the subsequent reaction of the motor current to the adaptation of the maximum current threshold or to predefine an adapted maximum current value curve in the case of local difficulties of movement.

SUMMARY OF THE INVENTION

The invention is based on the object of specifying an improved method for controlling an adjusting device of a motor vehicle, in which method reliable adjustment of the adjustment component is ensured. In this context, the intention is also, in particular, to reduce any trapping forces. Furthermore, a suitable adjusting device of a motor vehicle having a motor-driven adjustment component is to be specified.

The adjusting device of the motor vehicle is, for example, an electrically actuable vehicle door, tailgate, electric window lifter, electric sun roof or else a darkening device. In particular, the proposed method is preferably applied here during a closing movement of the adjustment component. In the normal operating mode, the speed of the drive, by which the adjustment component is moved along an adjustment path, is adjusted to a speed setpoint value, wherein this adjustment takes place at least in part of the adjustment path.

The speed setpoint value is, for example, constant at least in certain sections of the adjustment path or is functionally related to the adjustment path already executed and/or the position of the adjustment component. In particular, during the control of an electric window lifter the speed setpoint value is reduced compared to the speed setpoint value otherwise when the window pane is moved into an upper pane stop, usually provided with a sealing rubber. The speed setpoint value is, for example, stored in a table or a characteristic diagram, wherein, in this context, in particular the speed setpoint value is stored as a function of the operating temperature and/or ambient temperature as well as further ambient variables.

If difficulty of movement occurs during the movement of the adjustment component in the course of the adjustment to the speed setpoint value, the drive force is adjusted to a force setpoint value. In particular, the force setpoint value is lower than a legally prescribed limiting value or a value which would lead to damage to the adjusting device or to any occupants of the motor vehicle. For example, the force setpoint value is constant at least in certain sections of the adjustment path. The force setpoint value can also be dependent on ambient variables.

This adjustment is active for a first time period, where the time period can be changed, for example, by a user. In particular, this time period can be shortened or lengthened by activating a switch, such as for example a pushbutton key of the electric window lifter, which controls the adjustment device. The first time period is suitably adapted to current requests or operating conditions of the adjusting device. However, in particular, the first time period is constant and is, for example, between 0.1 s and 1 s, preferably 0.5 s.

After the expiry of the first time period, in the case of trapping, the drive which is operatively connected to the adjustment component is stopped or the adjustment component is reversed. The drive is therefore actuated in such a way that the adjustment component is moved along the adjustment path in the direction which is opposed to the original direction of movement.

The case of trapping is understood to mean that the difficulty of movement is caused by an object which is located within the adjustment range of the adjustment component and is in mechanical contact therewith. The object, for example, a body part of a person, such as a hand, is to be protected against injury or damage. Additionally or alternatively, the adjusting device is to be protected against damage if the object is configured in such a way that moving the adjustment component further along the adjustment path in the original direction of movement would lead to damage to the adjusting device. In particular, the object acts counter to the original direction of movement of the adjustment component.

If there is no risk of trapping, that is to say if, for example, the difficulty of movement is due to a brief disruption of the adjusting device such as, in particular, vibration or soiling within any guide rails present within which the adjustment component is located, then the adjustment component is adjusted again to the speed setpoint value after the expiry of the first time period.

The adjustment of the drive speed ensures that in the normal operating mode the adjustment component is always moved along the adjustment path in approximately the same time period. This gives rise to a pleasant perception of the vehicle occupants of the motor vehicle with respect to the adjustment movement and with respect to a predictable time at which the adjustment component is located in a specific position. Furthermore, the difficulty of movement which is caused for example by a short external disruption does not lead to the adjustment being aborted but instead the adjusting device moves the adjustment component reliably along the adjustment path into the desired position. If the disruption is the object located within the adjustment range, the object is not damaged owing to the force adjustment which limits the trapping force, wherein the adjusting device itself is likewise not damaged.

The difficulty of movement and the case of trapping are sensed, for example, by additional sensors, in particular by anti-trapping sensors in a stop region of the adjustment component. However, in one preferred embodiment, in normal operating mode the difficulty of movement is detected on the basis of the force required for the adjustment of the adjustment component, which takes place with a speed corresponding to the speed setpoint value. For example, adjustment is carried out to the force setpoint value as soon as the value for the drive force exceeds a specific limiting value and/or the increase in the required drive force within a defined time period exceeds a specific increased limiting value.

As soon as adjustment is carried out to the force setpoint value, it is expediently additionally or alternatively possible for the case of trapping to be detected on the basis of the implemented speed of the drive. In particular, the case of trapping is characterized by the fact that despite the drive force which is applied by the drive at the level of a suitable force setpoint value, the speed of the adjustment component is zero. However, if the value of the speed is above a specific limiting value or if the speed increases by a specific value within a specific time period, after the expiry of the first time period the speed is adjusted again to the speed setpoint value. In this context, the first time period is, for example, ended as soon as the value of the speed reaches a specific limiting value.

If, after the expiry of the first time period, it is not possible to determine clearly whether the case of trapping is occurring, the first time period is suitably lengthened, that is to say the adjustment to the force setpoint value is continued, until a differentiation is possible. This is the case, for example, if the adjustment component moves along the adjustment path but the value of the speed is below the specific limiting value.

If no case of trapping has occurred after the first time period expires, the speed of the adjustment component is suitably adapted in a continuous, in particular linear, fashion to the speed setpoint value. In this way, strong loading of the adjustment device and/or high driving forces which occur are avoided. Furthermore, the noise load on the occupants of the motor vehicle is lower. Likewise, the occupants have a more pleasant impression during the operation of the adjusting device since the adjustment component does not carry out any jolting movements.

In order to reduce the trapping forces which may be present, according to the first variant of the invention when the difficulty of movement is sensed, that is to say if the adjustment to the speed setpoint value is aborted, the drive force is first reduced to a first force. This has the result that the object is not trapped with the force setpoint value and with an additional force which arises from the moment of mass inertia of the adjustment component if the difficulty of movement is caused by the object. This additional force can be determined only in an extremely complicated way since the moment of mass inertia depends on the state of the adjusting device. Therefore, in particular the operating temperature and any wear phenomena which are present at the adjusting device influence the moment of mass inertia. Within a second time period, the drive force is increased to the force setpoint value. This measure ensures that the adjustment component reliably bypasses the difficulty of movement of the adjusting device, such as, for example, soiling, during the adjustment, wherein the trapping forces in the case of trapping remain as low as possible and can be dealt with.

Expediently, the first force is virtually zero. As a result, in the case of trapping essentially only the force caused by the moment of mass inertia is first applied to the object. The force diminishes within a very short time and given a corresponding speed setpoint value therefore leads to no damage or injury. As a result, during the rest of the adjustment phase to the force setpoint value a defined and known force is applied to the object. Therefore, given a suitable presetting of the force setpoint value, no damage or injury likewise occurs during the adjustment to the force setpoint value.

The increasing of the first force to the force setpoint value advantageously takes place in a continuous, in particular linear, fashion. In this way, strong loading of the adjusting device and of the object which may be present is avoided. In addition, the noise loading is low. If the object is an occupant's hand or the like, for example overreactions, resulting from jolting actuation of the adjusting part, are also avoided.

According to the second variant of the invention, a value for the drive force which is implemented during the normal operating mode is used as a force setpoint value to achieve a further reduction in the trapping forces which may be present in the case of trapping. The value, or a value, implemented during the normal operating mode for the drive force can also be used in combination with the first variant to lower the drive force to the first force as a force setpoint value. The object is therefore suitably not excessively damaged or injured any further during the phase of adjustment to the force setpoint value since the force setpoint value has already occurred before this adjustment phase occurs, and during this adjustment it was also necessary to allow for damage or injury to the object.

Both variants therefore have in common the fact that in order to differentiate between a case of trapping and difficulty of movement, there is a changeover from the rotational speed adjustment to a force adjustment and a time window is considered. While the changeover to the force adjustment in the first variant is carried out by reducing the drive force or the speed or the motor rotational speed and subsequently adjusting to a predefined force setpoint value, in the second variant the force control is performed by using as a setpoint value a force value which is present before the switching over from the speed adjustment or rotational speed adjustment to the force adjustment, without the speed or motor rotational speed being necessarily reduced in advance.

In the normal operating mode, the force setpoint value is expediently updated continuously. In one advantageous refinement, the force setpoint value corresponds to the value of the drive force which is implemented before a third time period, wherein the latter is, for example, between 0 s and 1 s and, in particular, 0.01 s. The force setpoint value is therefore adapted to current requirements of the adjusting devices, for example a changed ambient temperature. Furthermore, as a result no further components are required within the adjusting device for the adjustment, such as, for example, a memory for the characteristic diagram or further sensors for adapting the force setpoint value to the ambient variables.

If adjustment is again performed to the speed setpoint value after the expiry of the first time period, the force setpoint value is suitably kept constant for a fourth time period. In particular, the force setpoint value is not updated within the fourth time period if the fourth time period is longer than the third time period. During this fourth time period, the force setpoint value corresponds to the force setpoint value to which adjustment was performed during the first time period. In other words, after the adjustment component has overcome the difficulty of movement and the speed thereof is adjusted to the speed setpoint value, the force setpoint value corresponds, for the duration of the fourth time period, to the force setpoint value to which adjustment was performed while the adjustment component was moved as a result of the difficulty of movement.

The fourth time period is expediently between 0.05 s and 2 s, in particular, 0.5 s. It is suitably constant or ended as soon as the speed of the adjustment component exceeds a limiting speed. This therefore prevents, for example, the force setpoint value being increased continuously in the case of a number of instances of difficulty of movement. An increased drive force is therefore required during the speed adjustment subsequent to the first time period, in order to accelerate the drive again to the speed setpoint value.

With respect to the adjusting device, the specified object is achieved by the adjusting device having a speed and force adjustment device, wherein the adjustment is implemented, for example, in two separate control units or in one integrated control unit. The adjustment is active at least when the adjustment component is located in a part of the adjustment path and the adjustment component is to be moved. In the normal operating mode, the speed of the drive is adjusted to a speed setpoint value by the speed adjustment device.

In the case of difficulty of movement during operation, the force adjustment device intervenes and adjusts the drive force to a force setpoint value for a first time period. After the expiry of the first time period, suitable actuation of the drive causes the adjustment component to reverse or the drive is at least stopped when the difficulty of movement is due to a case of trapping. Otherwise, after expiry of the first time period renewed adjustment of the speed of the drive to the speed setpoint value takes place.

For example, the drive is a conventional electric motor and the adjustment device is an electric window lifter. The speed of the electric motor is advantageously sensed by Hall sensors, and the speed of the drive or the adjustment component is therefore measured. The electric motor is suitably supplied with energy by pulse width modulation, known per se. As a result, varying the pulse length or the mark-to-space ratio permits the power output of the electric motor to be set and therefore the drive force to be controlled.

It is also possible to change the power consumption and/or the electrical voltage applied to the electric motor and therefore to change the drive force by a variable resistance. The drive force is expediently determined by a motor-specific characteristic curve and the measured rotational speed. The speed and force adjusting device is advantageously configured in such a way that it can be integrated into already existing components of a conventional electric window lifter, with the result that the window lifter can be retrofitted to the proposed method by a software update, for example.

Other features which are considered as characteristic for the invention are set forth in the appended claims.

Although the invention is illustrated and described herein as embodied in a method and a device for controlling an adjusting device of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Corresponding components are provided with the same reference symbols in all the figures.

Figure 1:
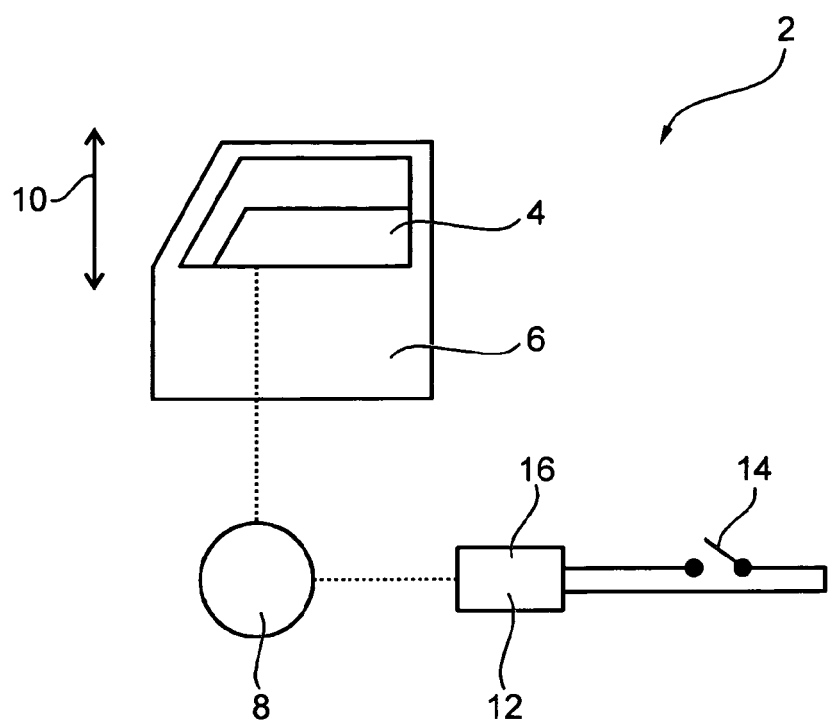
FIG. 1 is a schematic illustration of an adjustment device having a motor-driven adjustment component according to the invention.

Referring now to the figures of the drawing in detail and first, particularly, to FIG. 1 thereof, there is shown in schematic form an adjusting device 2 with an adjustment component 4. The adjusting device 2 is, for example, an electric window lifter which is integrated into a door 6 of a motor vehicle. The adjustment component 4 is here a window pane which is moved along an adjustment path 10 by a drive 8. The drive 8 is controlled by a control unit 12 which is actuated by a pushbutton key 14 by an occupant of the motor vehicle. A speed and force adjusting device 16 is located inside the control unit 12.

The drive 8 is, for example, an electric motor which is operated by pulse width modulation. The electrical energy supplied to the drive 8 is controlled by varying the mark-to-space ratio. In particular, the energy is in a functional relationship with a drive force 18 which moves the adjustment component 4 along the adjustment path 10. The relationship is, for example, linear, and during the control process the electrical voltage which is applied to the electric motor is, in particular, constant. Furthermore, the electric motor preferably has two Hall sensors by which the rotational speed of the electric motor and therefore a speed 20 of the drive 8 are measured.

Figure 2:
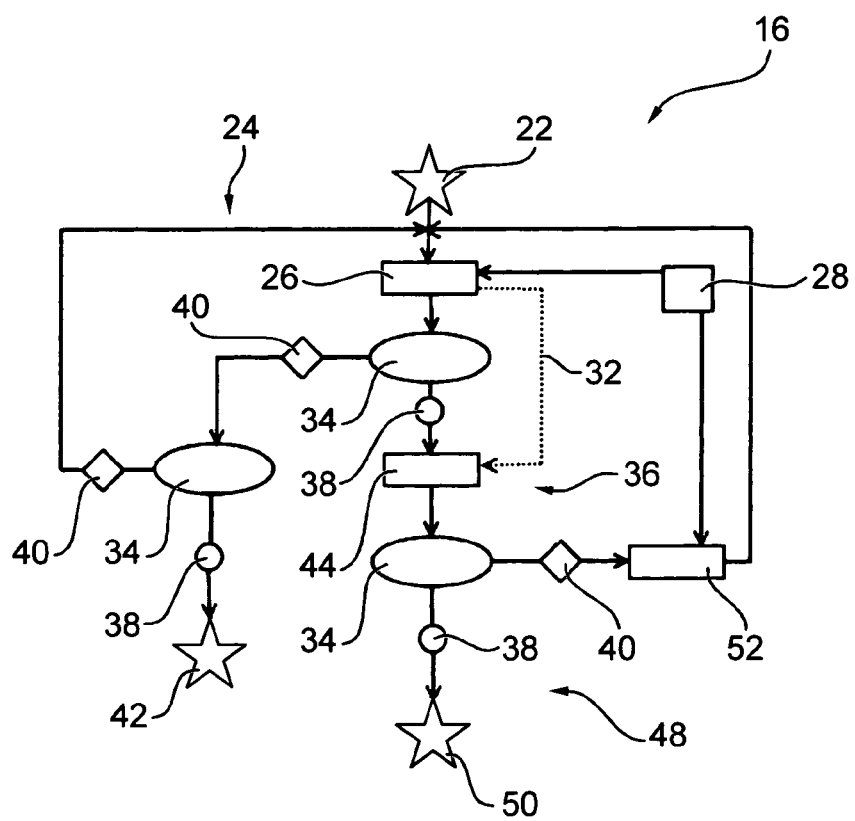
FIG. 2 is a flow chart describing a method for operating the adjusting device with the adjustment component.

FIG. 2 shows the timing sequence of a method for operating the adjusting device 2, in particular during a closing process of the window pane. The method is integrated in the speed and force adjusting device 16. As soon as a starting event 22 occurs, in a normal case 24 a speed adjusting device 26 is activated and adjusts the speed 20 of the drive 8 to a speed setpoint value 28. The starting event 22 is, for example, the activation of the pushbutton key 14 or the fact that a specific position along the adjustment path 10 has been reached by the adjustment component 4.

During the adjustment to the speed setpoint value 28, which is, for example, constant, the drive force 18 which is required for the adjustment before a third time period 30 is stored as a force setpoint value 32. In addition, the drive force 18 is monitored by a monitoring unit 34 to determine whether difficulty of movement 36 is occurring. If the drive force 18 increases, for example, very strongly or if it is higher than a specific limiting value, the monitoring unit 34 transmits a positive signal 38. Otherwise, the monitoring unit 34 transmits a negative signal 40. In the case of the negative signal 40, a further monitoring unit 34 monitors whether the adjustment component 4 has reached the end of the adjustment path 10 or at least the end of the part of the adjustment path 10 within which the adjustment component 4 is moved by the method. If this is the case, the final event 42 occurs which ends the method. Otherwise, the speed 20 of the adjustment component 4 continues to be adjusted to the speed setpoint value 28 by the speed adjusting device 26.

When difficulty of movement 36 occurs, the drive force 18 is adjusted to the force setpoint value 32 for a first time period 46 by a force adjusting device 44. After the expiry of the first time period 46, it is checked by a further monitoring unit 34 whether the difficulty of movement 36 is a case of trapping 48. The differentiation is made on the basis of the implemented speed 20 of the drive 8. If the speed 20 is, for example, zero or virtually zero, the case of trapping 48 is identified. If an object such as, for example, a hand of one of the occupants of the motor vehicle is touched by the window pane, a trapping event 50 occurs. In this context, the drive 8 is either stopped or actuated in such a way that the adjustment component 4 is moved in the direction opposing the original direction of movement, with the result that the object is freed from the trapping. Otherwise, if no case of trapping 48 is occurring, the speed 20 of the drive 8 is adapted linearly again to the speed setpoint value 28 by a speed adaptation unit 52. After this, the speed adjusting device 26 is active again.

Figure 3:
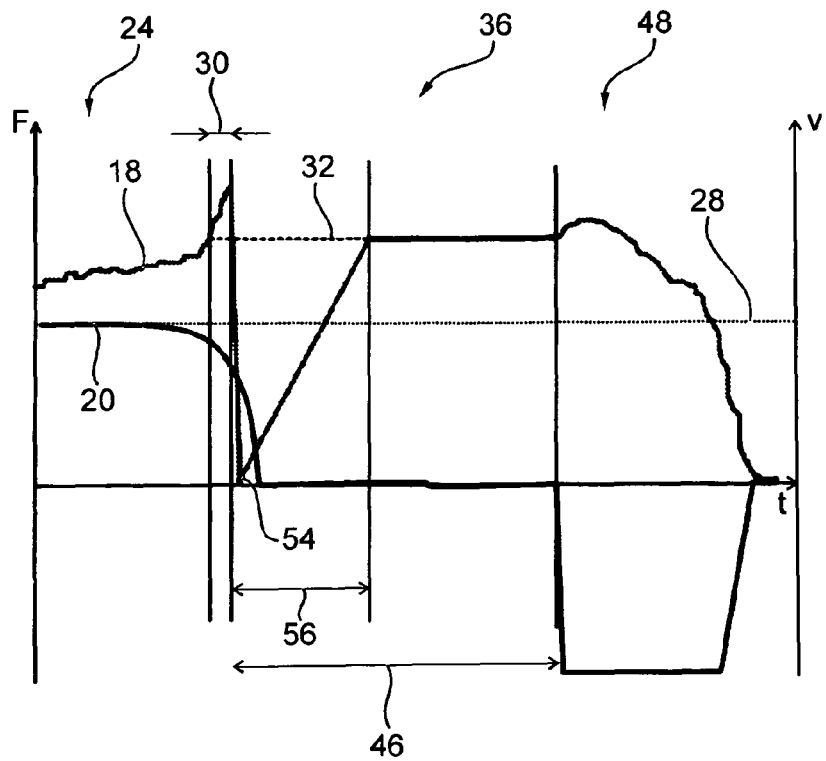
FIG. 3 is a graph showing a time profile of speed and of force of a drive in the case of difficulty of movement, which is a case of trapping.

FIG. 3 illustrates a portion of the time profile of the drive force 18 and of the speed 20 of the drive 8. In the normal operating mode 24, the speed 20 is adjusted to the speed setpoint value 28. If the drive force 18 which is required for this increases above a limiting value, the case of difficulty of movement 36 is identified. The drive force 18 is then adjusted to the force setpoint value 32 for the first time period 46. In this context, the value of the drive force 18 which served as the drive force 18 for the third time period 30 before the start of difficulty of movement 36 is used as the force setpoint value 32. After the detection of difficulty of movement 36 during the adjustment to the force setpoint value 32, the drive force 18 is first reduced to a first force 54, wherein the first force 54 is virtually zero.

Within a second time period 56, the drive force 18 is increased linearly to the force setpoint value 32. During the first time period 46, the speed 20 of the drive 8 is monitored. If the speed 20 is zero or virtually zero after the expiry of the first time period 46, it is assumed that an object is located within the adjustment path 10 and therefore the case of trapping 48 is present. In order to end the trapping, the drive 8 is subsequently reversed. The adjustment component 4 then moves in the direction opposing the original direction of movement. After a certain time period has passed, the drive 8 is, for example, completely stopped.

Figure 4:
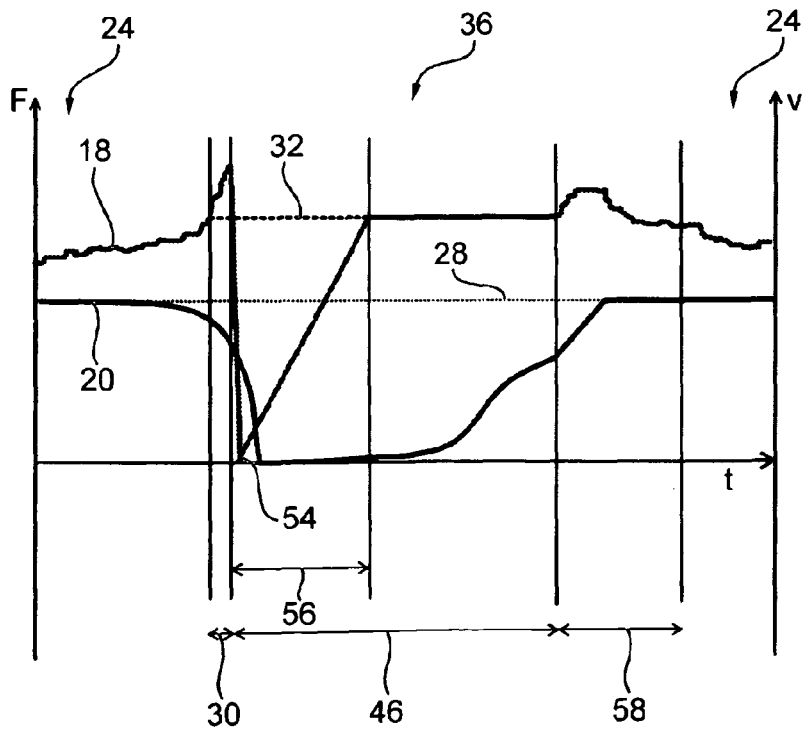
FIG. 4 is a graph showing the profiles according to FIG. 3 in the case in which the difficulty of movement is not a case of trapping.

In FIG. 4, in contrast to the case illustrated in FIG. 3, the difficulty of movement 36 is not a case of trapping 48. After the expiry of the first time period 46, the speed 20 is no longer zero, for example it is, as shown here, approximately a third of the speed setpoint value 28. The adjustment to the force setpoint value 32 is followed again by the adjustment to the speed setpoint value 28, and the speed 20 is increased linearly to the speed setpoint value 28. If a further difficulty of movement 36 occurs within a fourth time period 58 after the first time period 46, the previous force setpoint value 32 is used during the renewed force adjustment. The force setpoint value 32 is not updated again and does not correspond to the drive force 18 respectively required for the adjustment before the third time period 30 until after the expiry of the fourth time period 58. If no further difficulty of movement 36 is present, the adjustment device 2 is again in the normal operating mode 24.

The invention claimed is:

1. A method for controlling an adjusting device of a motor vehicle, the adjusting device having a motor-driven adjustment component, which further comprises the steps of:
adjusting, at least in one part of an adjustment path, in a normal operating mode, a speed of a drive to a speed setpoint value; and
adjusting, in a case of difficulty of movement, a drive force to a force setpoint value for a first time period, wherein, after an expiry of the first time period, performing at least one of the further steps of:
reversing the motor-driven adjustment component;
stopping the drive if a risk of trapping is detected; or
adjusting the speed of the drive again to the speed setpoint value if the case of difficulty of movement is not a case of trapping, wherein in a case of difficulty of movement the drive force is first reduced to a first force and increased to the force setpoint value within a second time period.

2. The method according to claim 1, which further comprises:
detecting in the normal operating mode the difficulty of movement on a basis of a change in force; and
detecting in the case of difficulty of movement the case of trapping on a basis of a change in the speed.

3. The method according to claim 1, wherein in that after the expiry of the first time period, an adaptation of the speed to the speed setpoint value takes place in a linear fashion.

4. The method according to claim 1, wherein in the case of difficulty of movement, the drive force is reduced such that the first force is virtually zero.

5. The method according to claim 1, wherein in the case of difficulty of movement within the second time period, the increase in the drive force to the force setpoint value takes place in a linear fashion.

6. The method according to claim 1, wherein the adjusting device is a window lifter.

7. A method for controlling an adjusting device of a motor vehicle, the adjusting device having a motor-driven adjustment component, which comprises the steps of:
adjusting, at least in one part of an adjustment path, in a normal operating mode, a speed of a drive to a speed setpoint value;
adjusting a drive force, in a case of difficulty of movement, to a force setpoint value equal to a drive force in the normal operating mode, for a first time period, wherein, after an expiry of the first time period, performing one of the following steps of:
reversing the motor-driven adjustment component;
stopping the drive if a risk of trapping is detected; and
adjusting the speed of the drive again to the speed setpoint value if the case of difficulty of movement is not a case of trapping, wherein a value for the drive force which is implemented during the normal operating mode is used as the force setpoint value.

8. The method according to claim 7, which further comprises:
detecting in the normal operating mode the difficulty of movement on a basis of the change in force; and
detecting in the case of difficulty of movement the case of trapping on a basis of a change in speed.

9. The method according to claim 7, wherein after the expiry of the first time period, an adaptation of the speed to the speed setpoint value takes place in a linear fashion.

10. The method according to claim 7, wherein in the normal operating mode the force setpoint value is updated continuously and corresponds to a value of the drive force implemented before a third time period.

11. The method according to claim 7, wherein after the expiry of the first time period during a renewed adjustment to the speed setpoint value the force setpoint value is kept constant within a fourth time period and the force setpoint value corresponds to the force setpoint value used for the preceding force adjustment.

12. The method according to claim 1, wherein the adjusting device is a window lifter.

13. An adjustment device of a motor vehicle, comprising:
a motor-driven adjustment component;
a drive; and
a speed and force adjusting means which, at least in part of an adjustment path, in a normal operating mode adjusts a speed of said drive to a speed setpoint value, and in a case of difficulty of movement adjusts a drive force to a force setpoint value, wherein, after expiry of a first time period in a case of trapping, either said motor-driven adjustment component reverses, said drive stops, or a renewed speed adjustment of said drive to the speed setpoint value takes place, if the case of difficulty of movement is not a case of trapping, wherein in a case of difficulty of movement the drive force is first reduced to a first force and increased to the force setpoint value within a second time period.

14. The adjustment device according to claim 13, wherein the force setpoint value is a value for the drive force which is implemented during the normal operating mode.

15. The adjustment device according to claim 13, wherein the adjustment device is a window lifter.

* * * * *